(12) United States Patent
Enzmann et al.

(10) Patent No.: US 7,890,125 B2
(45) Date of Patent: Feb. 15, 2011

(54) INTERACTIVE PUSH SERVICE

(75) Inventors: Mark Enzmann, Blairsville, GA (US);
Roger N. Mahler, Marietta, GA (US);
Kennie Yiu-Hon Kwong, Atlanta, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 867 days.

(21) Appl. No.: 10/350,253

(22) Filed: Jan. 24, 2003

(65) Prior Publication Data
US 2003/0224810 A1 Dec. 4, 2003

Related U.S. Application Data

(60) Provisional application No. 60/384,740, filed on May 30, 2002.

(51) Int. Cl.
*H04W 4/00* (2009.01)

(52) U.S. Cl. ............... 455/466; 455/445; 455/414.1; 455/418; 455/419; 455/426.1; 455/454; 455/41.2; 455/41.3; 370/338

(58) Field of Classification Search ............... 455/419, 455/466, 426, 423, 424, 425, 67.11; 379/32.01, 379/32.05
See application file for complete search history.

(56) References Cited

U.S. PATENT DOCUMENTS

| | | | | |
|---|---|---|---|---|
| 6,097,939 A * | 8/2000 | Jacobs | ................. | 455/410 |
| 6,788,933 B2 * | 9/2004 | Boehmke et al. | ............ | 455/423 |
| 6,795,711 B1 * | 9/2004 | Sivula | ................. | 455/466 |
| 6,956,831 B1 * | 10/2005 | Mahr | ................. | 370/310 |
| 2002/0069176 A1 * | 6/2002 | Newman | ................. | 705/53 |
| 2002/0077134 A1 * | 6/2002 | Mizell et al. | ................. | 455/466 |
| 2002/0089968 A1 * | 7/2002 | Johansson et al. | ............ | 370/349 |
| 2002/0123335 A1 * | 9/2002 | Luna et al. | ................. | 455/419 |
| 2003/0022662 A1 * | 1/2003 | Mittal | ................. | 455/418 |
| 2003/0092383 A1 * | 5/2003 | Moles et al. | ................. | 455/41 |
| 2003/0200409 A1 * | 10/2003 | Sayag | ................. | 711/170 |
| 2005/0091501 A1 * | 4/2005 | Osthoff et al. | ............ | 713/181 |

\* cited by examiner

*Primary Examiner*—Patrick N Edouard
*Assistant Examiner*—Justin Y Lee
(74) *Attorney, Agent, or Firm*—Woodcock Washburn LLP

(57) ABSTRACT

The present invention is a method and system for pushing data to a mobile station. A message is pushed from the push content server to a Java-enabled mobile terminal. A Java MIDlet on the mobile terminal then intercepts the message and determines the appropriate delivery of the SMS message. The Java MIDlet can determine whether to present the SMS message via normal SMS protocol, present the SMS message to the screen of the mobile device, reject the SMS message, or automatically accept the SMS message. If the message is accepted by the mobile device, the Java MIDlet may initiate GPRS or EDGE interface to request data to the mobile device.

16 Claims, 4 Drawing Sheets

INTERACTIVE PUSH SERVICE

PRIORITY

This application claims the benefit of priority from U.S. Provisional Application No. 60/384,740 entitled "INTERACTIVE PUSH SERVICE" filed on May 30, 2002.

FIELD OF THE INVENTION

The present invention relates to the field of telecommunications, and more particularly, to a method and system for pushing data to a mobile device.

BACKGROUND OF THE INVENTION

Push services in mobile devices currently utilize SMS or WAP technology. Push services surrounding the use of SMS are disadvantageous because SMS bandwidth is a very finite commodity. SMS bandwidth is limited to one channel in any sector, regardless of whether a GSM or ANSII service is involved. Thus, a SMS push may only use one out of thirty or one out of sixty channels to deliver the message. Additionally, SMS push poses significant size requirements on the message, with a maximum payload of 128 bytes.

Another alternative push for a mobile device in the prior art is a WAP push. A WAP push involves an IP push of a message onto the mobile device. However, a WAP push is also disadvantageous because such a push requires a WAP-enabled mobile device. While a mobile device may be SMS-enabled, the mobile device may not necessarily be WAP-enabled as well. Furthermore, the WAP push is also limited by a small message size, in addition to the required WAP overhead in order to effectuate the WAP push.

Thus, there is a need in the art for a system and method for providing an system and method for pushing data to a mobile device that overcomes the aforementioned deficiencies in the prior art. There is also a need for a method and system for pushing data to a mobile device wherein both the mobile device and the associated SIM card for the mobile device are JAVA-enabled.

SUMMARY OF THE INVENTION

To alleviate these constraints, this invention utilizes the broadband services that are currently entering wireless technology. By utilizing a Java-enabled handset, the user experience is enhanced so that the SMS message is accepted by the mobile device and is filtered into a Java MIDlet. The Java MIDlet performs actions to allow the SMS to process the message and to procure additional messaging through a broadband connection. The Java MIDlet may even allow a user to specify only acceptance of messages from a particular sender. Once the customer configures these preferences, the Java MIDlet effectuates the filtering action, the acceptance, and the procuring of the additional data through the broadband side without utilizing the limited SMS resource.

BRIEF DESCRIPTION OF THE DRAWINGS

Preferred and alternative embodiments will now be described with reference to the attached figures wherein like reference numerals indicate similar or identical features or functions, and wherein.

DETAILED DESCRIPTION

Reference will now be made in detail to the present invention, examples of which are illustrated in the accompanying drawings. Wherever possible, the same reference numbers will be used throughout the drawings to refer to the same or like parts. Generally stated, the present invention provides a method and system for pushing data to a mobile device. In particular, the present invention provides a method and system for pushing data to a mobile device wherein both the mobile device and the associated SIM card for the mobile device are JAVA-enabled.

Figure 1:
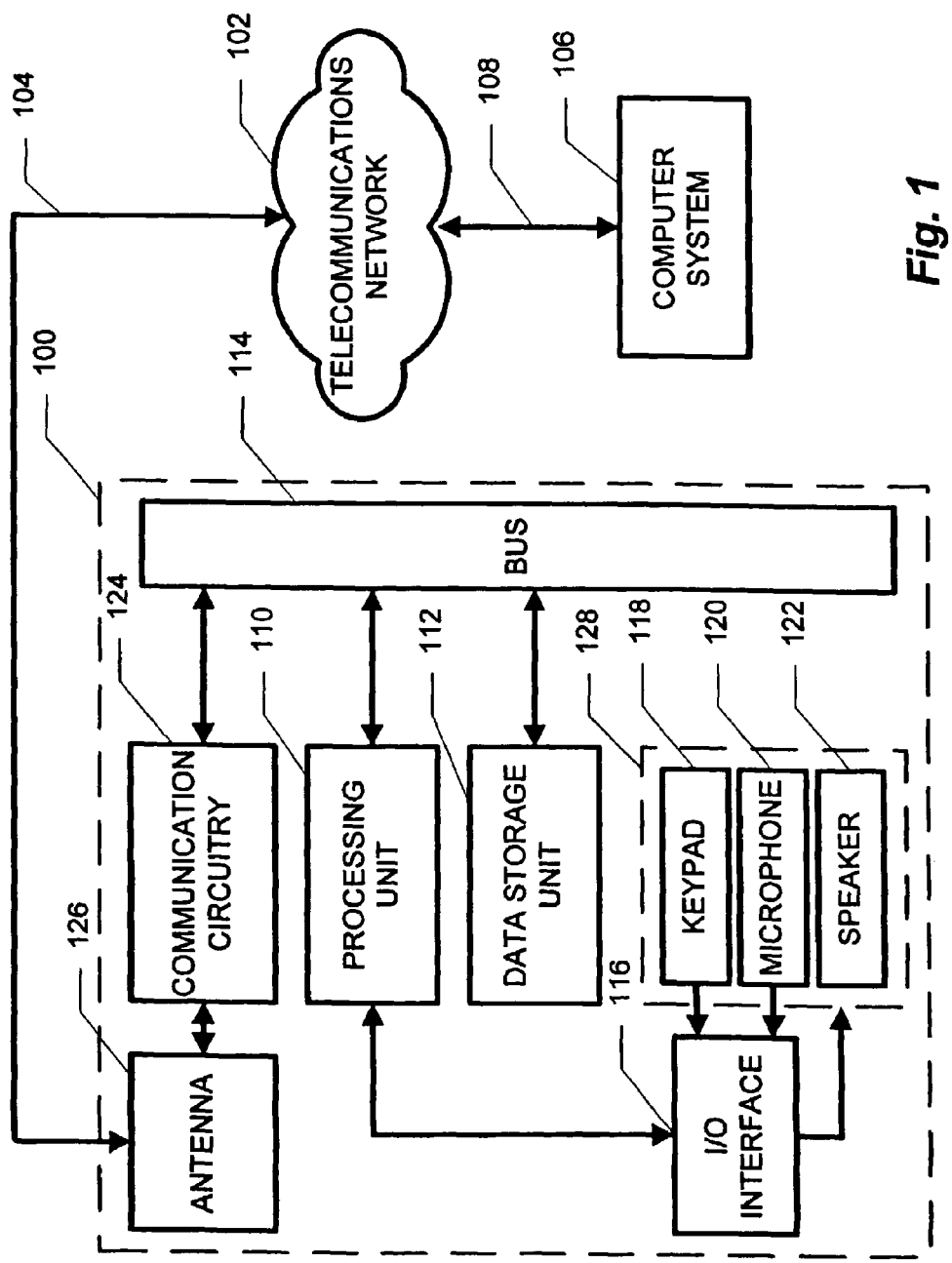
FIG. 1 is a block diagram representation illustrating an exemplary environment in accordance with the first embodiment of the present invention.

FIG. 1 is a block diagram representation illustrating an exemplary system in accordance with the first embodiment of the present invention. The communication device 100 places and receives calls with communications network 102, in addition to any other communications, via a bi-directional communications link 104. Computer system 106 may also communicate with communication device 100, and is coupled to communications network 102 via a bi-directional communications link 108. Communication device 100 may be any device capable of receiving and transmitting data on a communications network to establish communication with another communication device.

As depicted in FIG. 1, communication device comprises a processing unit 110 that is communicatively coupled via bi-directional communications link to the other components of the communication device via a bus 114. Communication device 100 also comprises an I/O interface 116, which may reside on the same microprocessing chip as the processing unit 110. However, I/O interface 116 may also reside on an external unit. I/O interface 116 connects the processing unit 210 to a user interface 128.

In the case of a telephone device such as a wireless or wired device, user interface 128 comprises keypad input 118, microphone input 120, and speaker output 122. The I/O interface 116 may include an analog-to-digital converter for converting an analog microphone signal to a digital signal for use by the processing unit 110. I/O interface 116 may also include a digital-to-analog converter to convert digital information from the processing unit 111 to the speaker 122, such as voice data.

Figure 2:
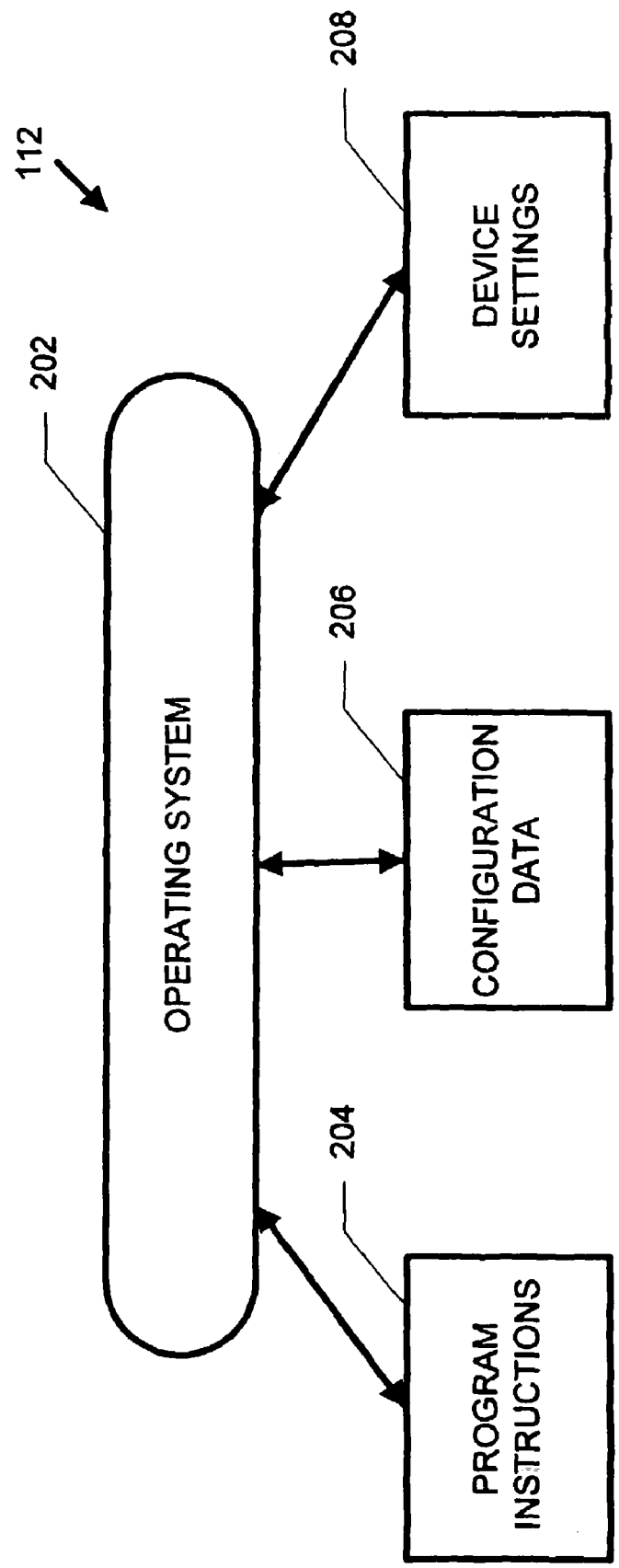
FIG. 2 is a block diagram representation of the data storage unit of the communication device in accordance with present invention.

Communication device 100 further comprises a data storage unit 112, which is discussed in greater detail in FIG. 2. Data storage unit 112 may be any type of memory, including but not limited to RAM, EPROM, or EEPROM memory, and may store either volatile or non-volatile memory. The processing unit 110 and the data storage unit 112 may communicate via a system bus 114. Alternatively, the processing unit 110 and the data storage unit 112 may be included on the same microprocessing chip.

The processing unit 110 transmits and receives digital signals to be communicated outside the communication device 100 via the communication circuitry 124. The communications circuitry 124 communicates with the communications network 102 via bi-directional communications link 104. If communication device 100 is a wireless device, the communication circuitry 124 is connected to communications network interface 126, which is an antenna in the wireless device embodiment. Antenna 126 then communicates signals through airwaves to communications network 102 via a bi-directional communications link 104. The bi-directional communications link 104 is a wireless link established when a call is placed to or from the communication device 100, or when another activity involving the utilization of bandwidth occurs with communication device 100.

Communications network 102 includes various components required to enable communication between two or more communication devices, including wired connections, wireless connections, switches, and other devices for establishing communication in the network. Communications network 102 is also communicatively coupled to a computer system 106 via a bi-directional communication link 108. The computer system 106 may be any computer system interacting with the communications network, including but not limited to, a SMS server, an instant messaging client or a server for a wireless services carrier.

FIG. 2 is a block diagram representation of the data storage unit of the communication device in accordance with present invention. Data storage unit 112 comprises operating system 202, which contains instructions for operating the communication device 100. The program instructions unit 204 includes instructions for the processing unit to execute the methods disclosed in the present invention, in addition to any other instructions. The configuration data unit 206 is also included in the data storage unit 212, and contains configuration information regarding the assortment of components that make up the system of the present invention.

The data storage unit 112 further comprises a device settings unit 208. The device settings unit 208 contains various parameters indicating the settings of the communication device 100, in addition to any other data. Device settings which may be stored in the device settings unit 208 include, but are not limited to, ring type, touch tone type, or appearance of the user interface 128.

Figure 3:
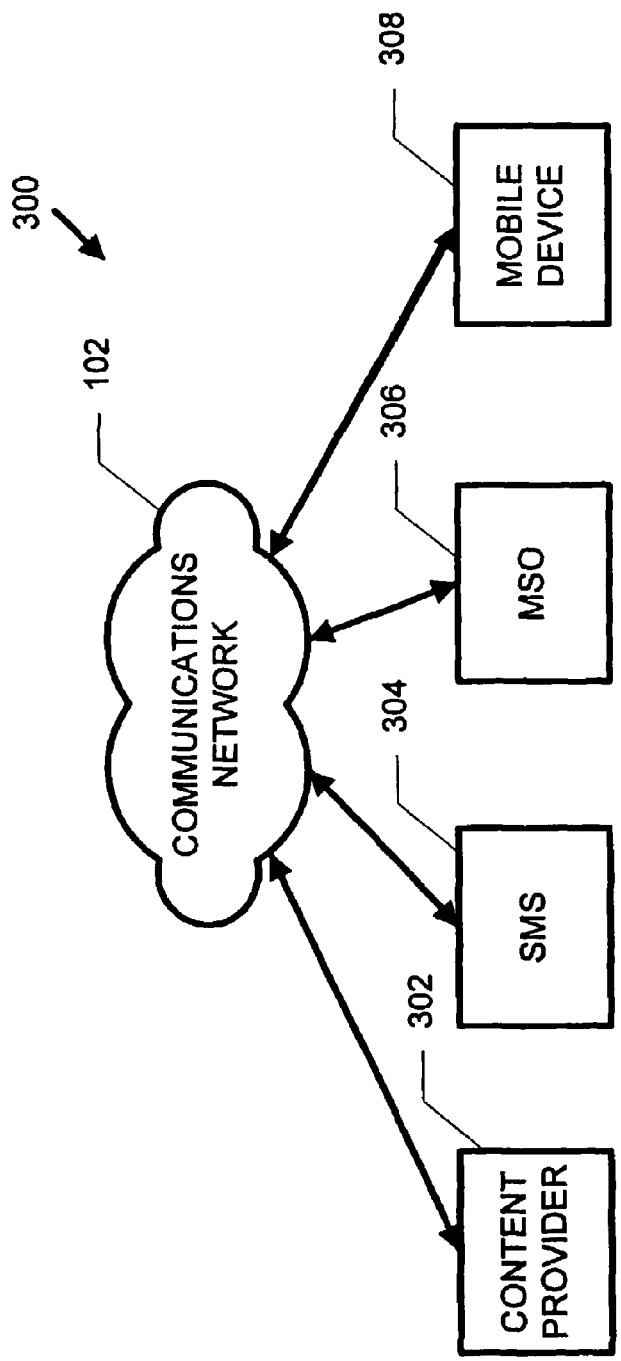
FIG. 3 is a block diagram illustrating the exemplary system in accordance with the present invention.

FIG. 3 is a block diagram illustrating the exemplary system in accordance with the present invention. In the exemplary system 300, communications network 102 is a combined signaling and data network which is coupled to an interfacing unit (not shown) to allow direct IP access to prevent the need to direct all IP signaling through the mobile switching office ("MSO") device.

The SMS device 304 may be a stand-alone device. Alternatively, SMS device 304 may be incorporated within the MSO device 306. In accordance with the present invention, the SMS sends a message to mobile device 308 via communications network 102. The mobile device 308 is a Java-enabled device. The SMS message is normally prefixed according to how the message originated or the type of message. In accordance with the present invention, however, particular sockets in the mobile device are requested for each SMS message.

A Java MIDlet on the mobile device intercepts the message. This Java MIDlet contains two portions: an operator portion and the carrier portion. These two portions are not mutually exclusive, and are not necessarily required to effectuate the present invention. These two portions allow a carrier to build a routine that will allow for particular message types to be handled in a certain manner.

The operator-based portion comprises the user-defined preferences. The user may define the preferences for handling messages of different types. These two portions include the information which is input to the Java MIDlet to specify how each message is to be handled. Thus, the message handling process is completely automated by the Java MIDlet in the mobile device 308. Instead of receiving notification of an incoming SMS message, upon receipt of an incoming message, the Java MIDlet examines the carrier and the operator, the carrier only, or the operator only, depending on the configuration, in order to receive information back as to how to handle the particular push message.

The push message will normally be associated with various detailed information regarding the message. However, because the mobile device is Java-enabled, no user interaction is required to handle incoming SMS messages. Thus, this process utilizes the communication channel via the telecommunications network between the content provider 302 and the mobile device 308, which alleviates stress upon the SMS device 304.

Figure 4:
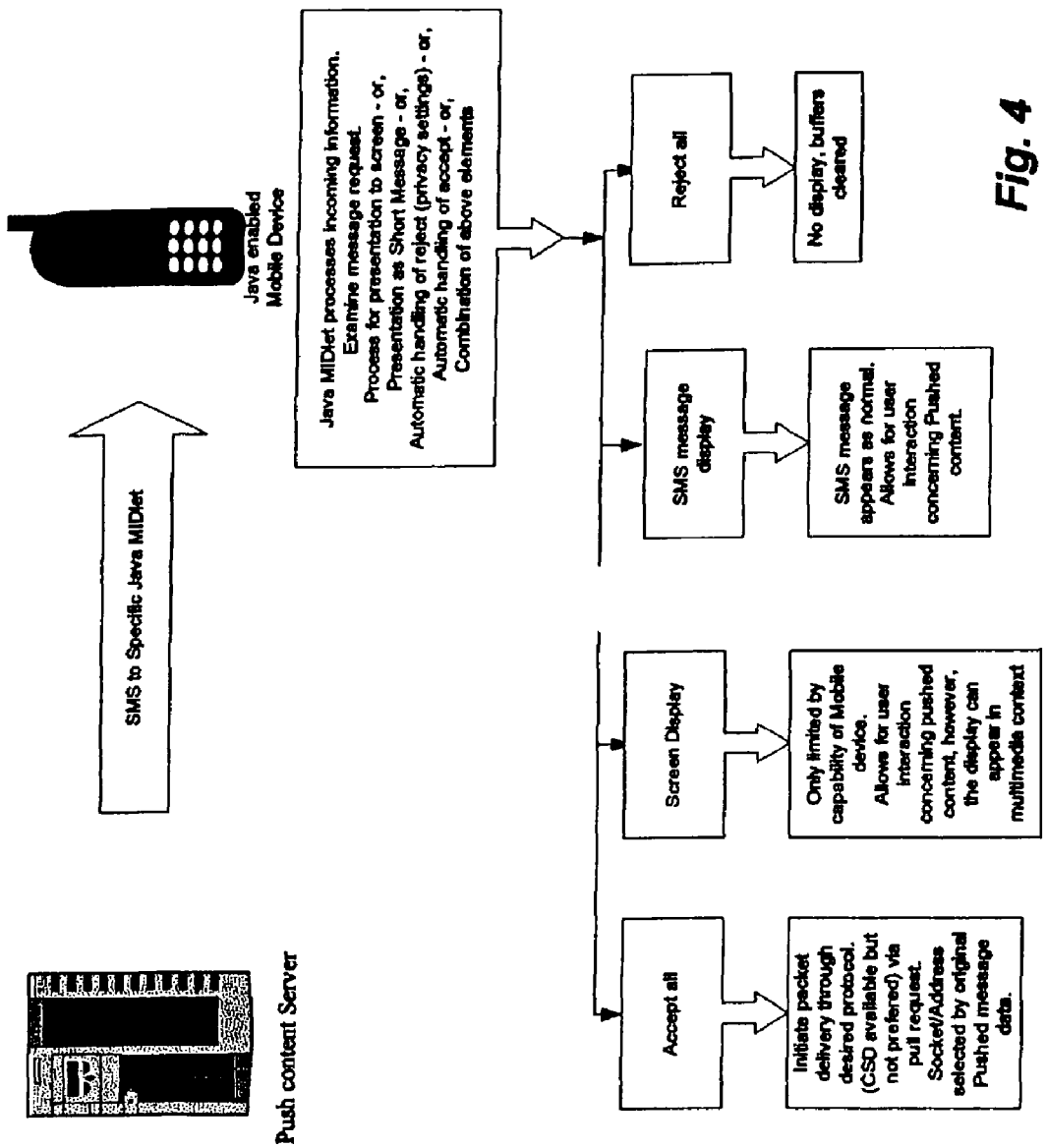
FIG. 4 is a diagram further illustrating the method and system of the present invention.

FIG. 4 is a diagram further illustrating the method and system of the present invention. As illustrated in FIG. 4, the push content server communicates a SMS to the specific Java MIDlet in the Java-enabled mobile device. Once the Java-MIDlet processes the incoming information, the message request is examined to determine how the message should be handled. If the mobile device is accepting all SMS messages, packet delivery is initiated through the desired protocol. If the SMS message is to be displayed on the screen, the message is displayed pursuant to the capabilities of the mobile device. If the SMS message is to be displayed as a normal SMS message, the SMS message appears pursuant to the configuration of the mobile device or user preferences. If the mobile device is rejecting all SMS messages, then the SMS message is not displayed and all buffers are cleared in the mobile device.

Other embodiments of this invention will be apparent to those skilled in the art from consideration of the specification and practice of the invention disclosed herein. It is intended that the specification and examples be considered as exemplary only, and within the scope and spirit of the invention as indicated in the description and the following claims.

What is claimed is:

1. A method of pushing SMS message data to a mobile device comprising the steps of:
    initiating the SMS message comprising a message request to the mobile device providing the SMS message to the mobile device via a bi-directional communications link comprising an Internet Protocol (IP) communications link;
    intercepting the SMS message in a Java MIDlet program executing on the mobile device; and
    interpreting the SMS message, via the Java MIDlet program executing on the mobile device, wherein the message request in the SMS message is examined by the Java MIDlet program over the communication channel between the content provider and the mobile device without utilizing SMS bandwidth to determine an appropriate handling of the SMS message, the appropriate handling comprising a selection among rejecting the message request; accepting the message request; and initiating packet delivery of a portion of the SMS message via a desired protocol.

2. The method of claim 1 wherein if the message request is accepted, the data is transferred by initiating a packet delivery protocol to the mobile device.

3. The method of claim 2 wherein the Java program executing on the mobile terminal requests further data transmissions from a content server.

4. The method of claim 3 wherein the further data transmissions occur without further interaction by a user.

5. The method of claim 1 wherein if the message request is accepted, the data is displayed on a screen of the mobile device.

6. The method of claim 5 wherein the data is displayed without further interaction by a user.

7. The method of claim 1 wherein if the message request is accepted, the data is processed by the mobile device as an SMS message.

8. The method of claim 1 wherein the rejecting or accepting step is performed in accordance with user-defined preferences.

9. The method of claim 1 wherein the Java MIDlet program comprise one of a carrier portion comprising a carrier designation or an operator portion comprising at least one user-defined preference.

10. A system for pushing SMS message data to a mobile device, the system comprising;
an SMS server;
a mobile device in communication with the SMS server, wherein the mobile device contains a Java MIDlet program executing thereon, and wherein the Java MIDlet program on the mobile device is configured to intercept a message request, the message request being contained in the SMS message being sent via a bi-directional communications link comprising an Internet Protocol (IP) communications link to the mobile device from the SMS server, and interpret that message request over the communication channel between the content provider and the mobile device without utilizing SMS bandwidth to determine an appropriate handling of the SMS message, wherein the appropriate handling comprising a selection among rejecting the message request; accepting the message request; and initiating packet delivery of a portion of the SMS message via a desired protocol.

11. The system of claim 10 further comprising a content server in communication with the SMS server.

12. The system of claim 11 wherein the Java MIDlet program executing on the mobile device processes the message request by establishing communication with the content server to download data to the mobile device.

13. The system of claim 10 wherein the Java MIDlet program executing on the mobile device processes the message request by rejecting the data.

14. The system of claim 10 wherein the Java MIDlet program executing on the mobile device processes the message request by displaying the data.

15. The system of claim 10 wherein the Java MIDlet program executing on the mobile device processes the message request by considering the data to be an SMS message.

16. The system of claim 10 wherein the Java MIDlet program executing on the mobile device processes the message based on predefined user preferences.

* * * * *